(12) United States Patent
Chen et al.

(10) Patent No.: US 6,931,496 B2
(45) Date of Patent: Aug. 16, 2005

(54) DATA-MAINTENANCE METHOD OF DISTRIBUTED SHARED MEMORY SYSTEM

(75) Inventors: Wei-Long Chen, Rochester, MN (US); Wayne Tseng, Shindian (TW); Jiin Lai, Shindian (TW)

(73) Assignee: Via Technologies, Inc., Shindian (TW)

( * ) Notice: Subject to any disclaimer, the term of this patent is extended or adjusted under 35 U.S.C. 154(b) by 313 days.

(21) Appl. No.: 10/409,756

(22) Filed: Apr. 9, 2003

(65) Prior Publication Data

US 2003/0191906 A1 Oct. 9, 2003

Related U.S. Application Data

(60) Provisional application No. 60/371,206, filed on Apr. 9, 2002.

(51) Int. Cl.[7] .............................................. G06F 12/08
(52) U.S. Cl. ....................................... 711/144; 711/148
(58) Field of Search ................................. 711/144, 121, 711/147, 148

(56) References Cited

U.S. PATENT DOCUMENTS

| 4,442,487 A | | 4/1984 | Fletcher et al. | |
|---|---|---|---|---|
| 5,241,664 A | * | 8/1993 | Ohba et al. | 711/121 |
| 5,479,630 A | * | 12/1995 | Killian | 711/3 |
| 6,081,806 A | * | 6/2000 | Chang et al. | 707/8 |
| 6,279,084 B1 | * | 8/2001 | VanDoren et al. | 711/141 |

FOREIGN PATENT DOCUMENTS

| EP | 0936553 A3 | 2/1999 |
|---|---|---|
| GB | 2178205 A | 2/1987 |

* cited by examiner

*Primary Examiner*—Hiep T. Nguyen
(74) *Attorney, Agent, or Firm*—Volpe And Koenig, P.C.

(57) ABSTRACT

A distributed shared memory (DSM) system includes at least a first and a second nodes. The first node includes an external cache for storing a data from a local memory of the second node and at least two processors optionally accessing the data from the external cache. Whether the data has been modified into a modified data by a first certain one of the at least two processors is first determined. If positive, whether a second certain one of the at least two processors is allowed to share the modified data is further determined. If the second certain processor is allowed to share the modified data, it may directly request the modified data from the first certain processor via a bus inside the first node.

18 Claims, 5 Drawing Sheets

DATA-MAINTENANCE METHOD OF DISTRIBUTED SHARED MEMORY SYSTEM

CROSS REFERENCE TO RELATED PATENT APPLICATION

This patent application is based on a U.S. provisional patent application No. 60/371,206 filed Apr. 9, 2002.

FIELD OF THE INVENTION

The present invention relates to a data-maintenance method of a distributed shared memory (DSM) system, and more particularly to a data-maintenance method of a distributed shared memory (DSM) system having an external cache (L3 cache).

BACKGROUND OF THE INVENTION

Due to the increasing advance of science and technology, digitized information processing means plays a more and more important role on our daily lives and business activities. Consequently, the data processing amount is too huge to be operated by using a simple data processing device, such as a computer system with a single processor and a local memory. In order to efficiently deal with a large quantity of data, a multi-processor system is developed to solve this problem.

So far, two types of parallel data-processing systems have been used. One is the tightly coupled parallel data-processing system, and the other is loosely coupled parallel data-processing system.

The tightly coupled parallel data-processing system includes a plurality of central processing units (CPUs) and a memory accessible by all the CPUs. This architecture is extended from a single-CPU system so as to have a relatively simple design. Such system, however, has an inherent limit. Since the plurality of CPUs access the memory via a single common bus, the overall scale of the system cannot be too large. Aside from, the large number of CPUs will load heavy burden on the bus.

On the other hand, the loosely coupled parallel data-processing system is a system consisting of a plurality of computers interconnected via a high-speed network. Via a delicately designed topological architecture, the loosely coupled parallel data-processing system can be quite expansible, compared to the tightly coupled parallel data-processing system. In other words, a large number of processors can be included in the system. Since the communication of the entire system is conducted via network, the complexity of the architecture would be much more difficult than the tightly coupled parallel data-processing system in order to achieve high performance.

In order to solve the problems of the above systems, a processing system involving a distributed shared memory (DSM) is developed for parallel data-processing and rapid data-sharing purpose for a remote node to access a local memory. The DSM system has the advantages of both of the tightly and loosely coupled parallel data-processing systems. That is, the DSM system is simple and expansible. Since 1980, a plurality of DSM systems have been practiced. One of the examples is the cache coherency non-uniform memory access (ccNUMA) architecture.

Figure 1:
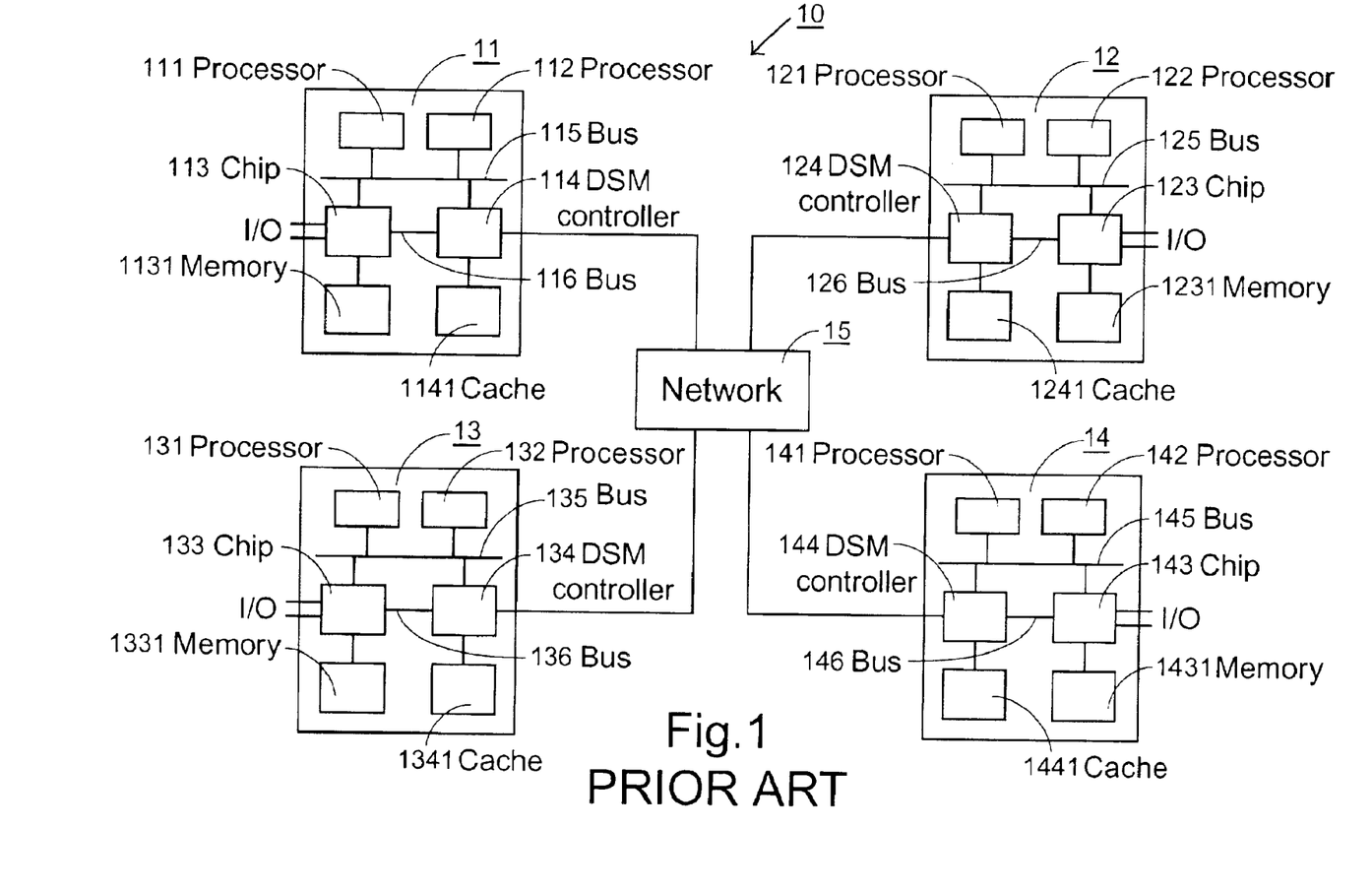
FIG. 1 is a schematic circuit block diagram showing a conventional distributed shared memory (DSM) system.

Please refer to FIG. 1, which is a block diagram illustrating a conventional ccNUMA-type DSM system. The DSM system 10 includes four nodes 11~14 interconnected by a network 15. The nodes 11~14, as shown, include respective processors 111, 112, 121, 122, 131, 132, 141, 142, memory control chips 113, 123, 133, 143 for I/O control and memory access, local memories 1131, 1231, 1331, 1431, DSM controllers 114, 124, 134, 144, external caches or L3 caches 1141, 1241, 1341, 1441, system buses 115, 125, 135, 145, and internal buses 116, 126, 136, 146. Each of the local memories 1131, 1231, 1331, 1431 is divided into a plurality of local memory lines for separately storing data which are local primary data belonging to its own node. Likewise, each of the caches 1141, 1241, 1341, 1441 is divided into a plurality of cache lines for separately storing cache data which are foreign data belonging to local memories of other nodes. The presence of the caches is for saving time for accessing data from the local memories of other nodes.

Each of the DSM controllers 114, 124, 134, 144 maintains a memory coherency directory stored therein (not shown) in order to realize the states of all the local memory lines. When any of the nodes is going to read data from a specific local memory line, the reading operation is guided by the DSM controller according to the memory coherency directory. The DSM controller also maintains a cache coherency directory stored therein (not shown) in order to realize the states of all the cache lines. When any of the nodes is going to read data from a specific cache line, the reading operation is guided by the DSM controller according to the cache coherency directory.

Since the DSM controllers of all nodes communicate with one another via the network 15, a network communication protocol such as TCP/IP would be used as the data transmission format for inter-communication.

The states of each of the L3 cache lines indicated by the cache coherency directory include CLEAN, FRESH, DIRTY, VOID, IDLE and STALE states. The meanings of these states are described as follows:

CLEAN: The data in the cache line of the local node also exists in a remote node, which is so-called as a home node, and the data has not been modified by a certain processor of the local node in spite the certain processor exclusively owns the data;

FRESH: The data in the cache line has not been modified by any of the nodes, and is shared by all the nodes;

DIRTY: The data in the cache line has been modified and exclusively owned by a certain processor of the local node, and thus has become different from that existing in the home node;

VOID: The data in the cache line has been invalidated, and new data is permitted to be written into the same position of the L3 cache;

IDLE: The cache line is in a transition state waiting to receive new data; and

STALE: The cache line is in a transition state waiting to delete therefrom stored data.

The data maintenance of the L3 cache, although being normally operated according to the above states, it is possibly inefficient especially when the cache line is in the DIRTY state. As is known, the data in the cache line is exclusively owned by a certain processor of the local node in the DIRTY state. Therefore, when another processor of the local node is to access the data in the cache line, it has to assert another system bus transaction request to access the data from the certain processor of the same node. Consequently, the load of the system bus inside the node is increased and thus the system efficiency is adversely affected.

Further, the access dead lock problem likely to occur between any two nodes for processing parallel data is generally solved by operation system (OS). Once the operation system cannot deal with the dead lock problem in time due to an unstable state thereof or any other factor, the DSM system possibly halts so as to adversely affect the reliability of the DSM system.

SUMMARY OF THE INVENTION

Therefore, an object of the present invention is to provide a data maintenance method of a DSM system to achieve the system bus transaction purpose with reduced transaction requests.

Another object of the present invention is to provide a data maintenance method of a DSM system to efficiently solve the access dead lock problem.

The present invention relates to a data maintenance method of a distributed shared memory (DSM) system. The DSM system includes at least a first and a second nodes. The first node includes an external cache for storing a data from a local memory of the second node and at least two processors optionally accessing the data from the external cache.

According to a first aspect of the present invention, the data maintenance method comprises steps of: discriminating whether the data, originated from the other node, has been modified into a modified data by a first certain one of the at least two processors; discriminating whether a second certain one of the at least two processors is allowed to share the modified data if the data has been modified by the certain processor; and directly requesting the modified data by the second certain processor via a bus inside the first node if the second certain processor is allowed to share the modified data.

In an example, each of the at least two processors is electrically connected to the bus which is preferably a system bus of the first node, and the second certain processor directly request the modified data without asserting any network transaction request.

In an example, the first and the second nodes are interconnected via a network operating under a network communication protocol such as TCP/IP.

In an embodiment, the modified data is exclusively accessed by the first certain processor if the second certain processor is not allowed to share the modified data.

In an embodiment, the discriminating steps are performed according to a cache coherency directory that records the state of a cache line of the external cache where the data is stored.

Preferably, the method further comprises steps of: discriminating whether a memory line of the local memory of the second node, where the data is stored, is in a transition state when the data is modified or accessed by the first certain processor so as to change the cache line from a first state to a second state; and recovering the state of the cache line from the second state to the first state if the memory line is in the transition state.

According to a second aspect of the present invention, the data maintenance method comprises steps of: discriminating whether the data has been modified by a first certain one of the at least two processors on the condition that a cache line of the external cache, where the data is stored, is in a CLEAN state; changing the state of the cache line from the CLEAN state to either of DIRTY-SHARED and DIRTY-ONLY state if the data has been modified into a modified data; and allowing a second certain one of the at least two processors to directly request the modified data via a bus inside the first node when the cache line is in the DIRTY-SHARED state. For example, the CLEAN, DIRTY-SHARED and DIRTY-ONLY states of the cache line are recorded in a cache coherency directory.

In an embodiment, the modified data is exclusively accessed by the first certain processor when the cache line is in the DIRTY-ONLY state.

Preferably, the method further comprises steps of: discriminating whether a memory line of the local memory of the second node, where the data is stored, is in a transition state, when the data is modified or accessed by the first certain processor so as to change the cache line from a first state to a second state; and recovering the state of the cache line from the second state to the first state if the memory line is in the transition state.

For example, the first state is a VOID state, and the second state is an IDLE state.

Alternatively, the first state is a FRESH state, and the second state is an IDLE state.

In an embodiment, the state of the cache line is recovered from the second state to the first state in response to a retry command asserted by the second node.

In an embodiment, the step of discriminating the state of the memory line is performed according to a local memory coherency directory.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is noted that the following descriptions of preferred embodiments of this invention are presented herein for purpose of illustration and description only; it is not intended to be exhaustive or to be limited to the precise form disclosed.

The DSM system as shown in FIG. 1 is used for illustrating an embodiment of the present invention. The states of the cache line indicated by a cache coherency directory, however, are modified to solve the problems encountered by the prior art.

In order to demonstrate the data transmission of the present DSM system. The cache-state transition is illustrated with reference to FIGS. 2 and 3 in response to a local access command and a remote access command, respectively.

Figure 2:
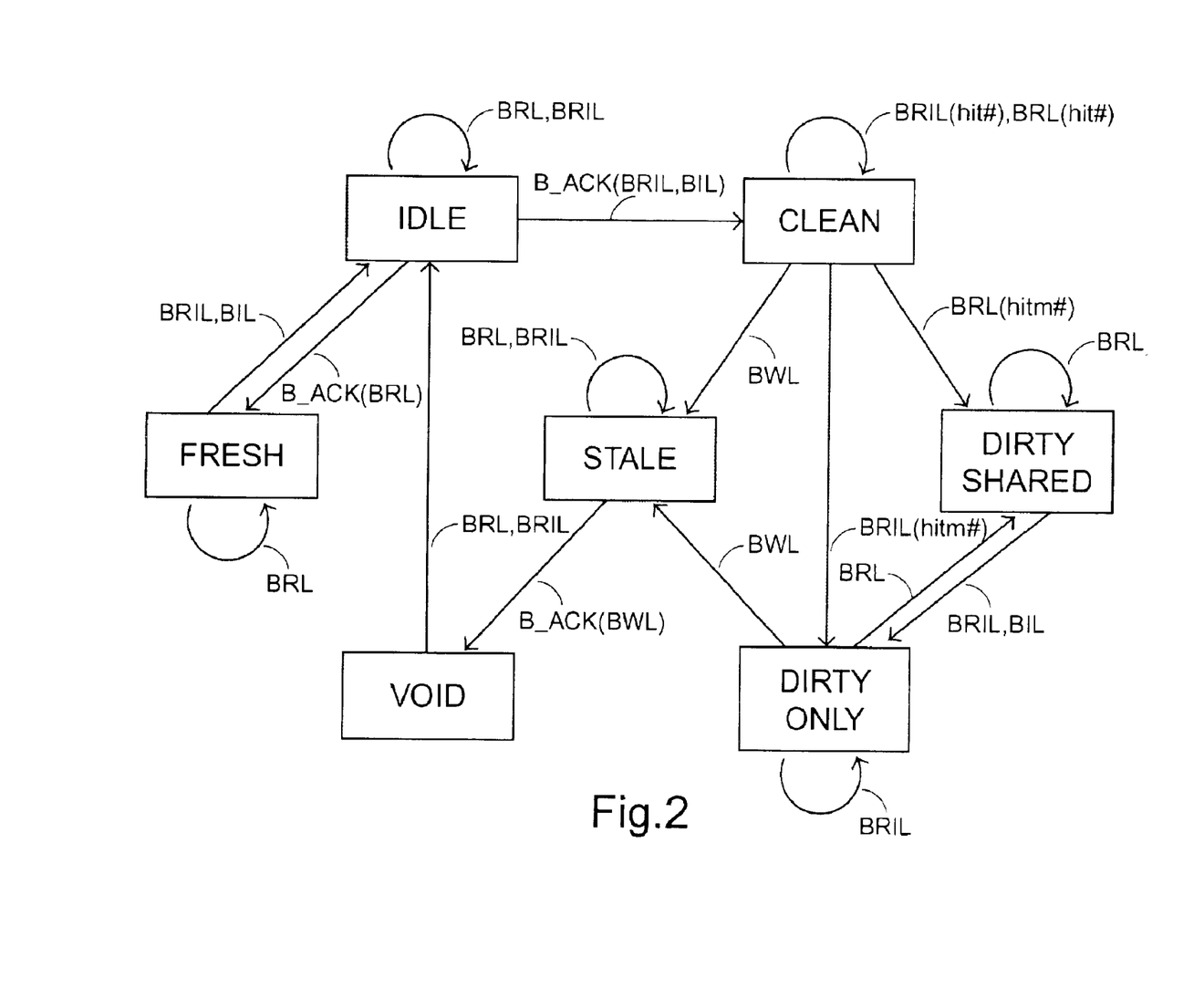
FIG. 2 is a schematic diagram showing various state of an L3 cache line in response to a local access command.
Figure 3:
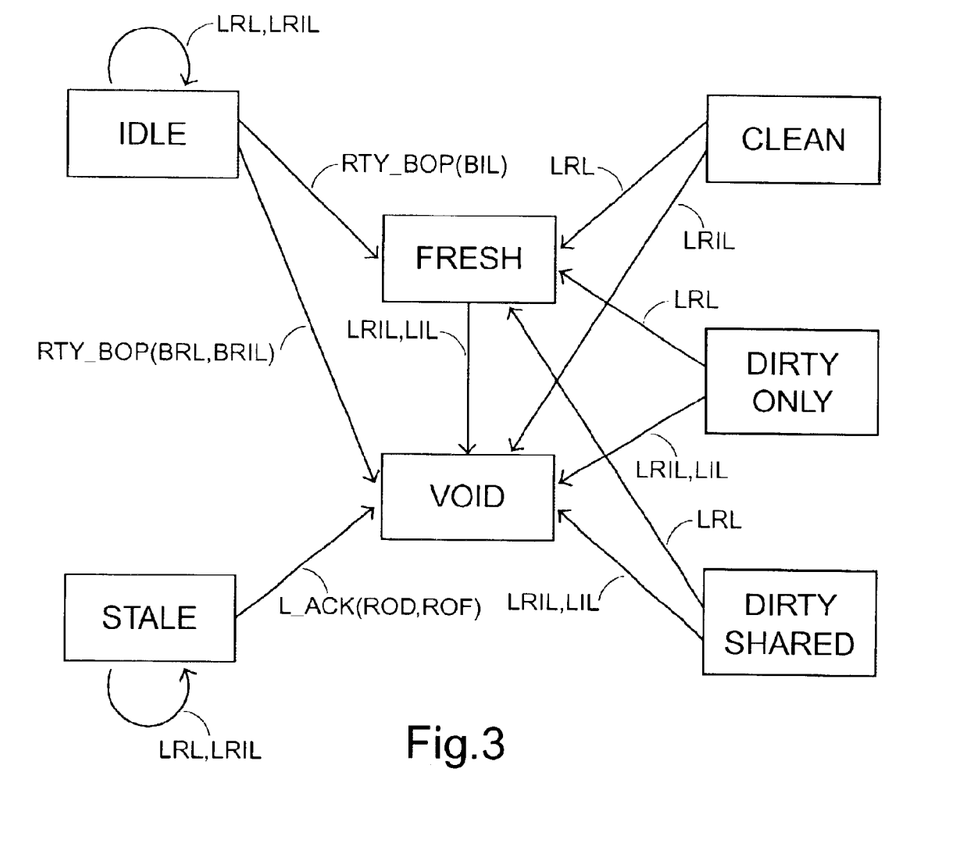
FIG. 3 is a schematic diagram showing various state of an L3 cache line in response to a remote access command.

According to the present invention, there are seven possible states for each of the L3 cache lines indicated by the cache coherency directory, which includes CLEAN, FRESH, DIRTY-ONLY, DIRTY-SHARED, VOID, IDLE and STALE states. The meanings of these states are described as follows:

CLEAN: The data in the cache line of the local node also exists in a remote node, which is so-called as a home node, and the data has not been modified by a certain processor of the local node in spite the certain processor exclusively owns the data;

FRESH: The data in the cache line has not been modified by any of the nodes, and is shared by all the nodes;

DIRTY-ONLY: The data in the cache line has been modified and exclusively owned by a certain processor of the local node, and thus has become different from that existing in the home node;

DIRTY-SHARED: The data in the cache line has been modified by a certain processor of the local node, and thus has become different from that existing in the home node, and the other processors of the local node can access the modified data;

VOID: The data in the cache line has been invalidated, and new data is permitted to be written into the same position of the L3 cache;

IDLE: The cache line is in a transition state waiting to receive new data; and

STALE: The cache line is in a transition state waiting to delete therefrom stored data.

The local access command asserted by a local processor via the system bus is:

BRL: The command is issued to read a shared copy of a specific data;

BRL(hit#): The command is issued to read a shared copy of the specific data which is stored in the local node and has not been modified;

BRL(hitm#): The command is issued to read a shared copy of the specific data which is stored in the local node and has been modified;

BRIL: The command is issued to read an exclusive copy of the specific data;

BRIL(hit#): The command is issued to read an exclusive copy of the specific data which is stored in the local node and has not been modified;

BRIL(hitm#): The command is issued to read an exclusive copy of the specific data which is stored in the local node and has been modified;

BIL: The command is issued to modify a shared copy of the specific data and exclusively own the specific data; or BWL: The command is issued to write the specific data back to the cache.

The remote access command asserted by a remote processor via the system bus is:

LRL: The command is issued to read a shared copy of the specific data;

LRIL: The command is issued to read an exclusive copy of the specific data;

LIL: The command is issued to modify a shared copy of the specific data and exclusively own the specific data;

RTY_BOP (BIL): The command is issued to recover the state of the cache line rendered in response to the BIL command back to the previous state; or RTY_BOP (BRL, BRIL): The command is issued to recover the state of the cache line rendered in response to the BRL or BRIL command back to the previous state.

Figure 4:
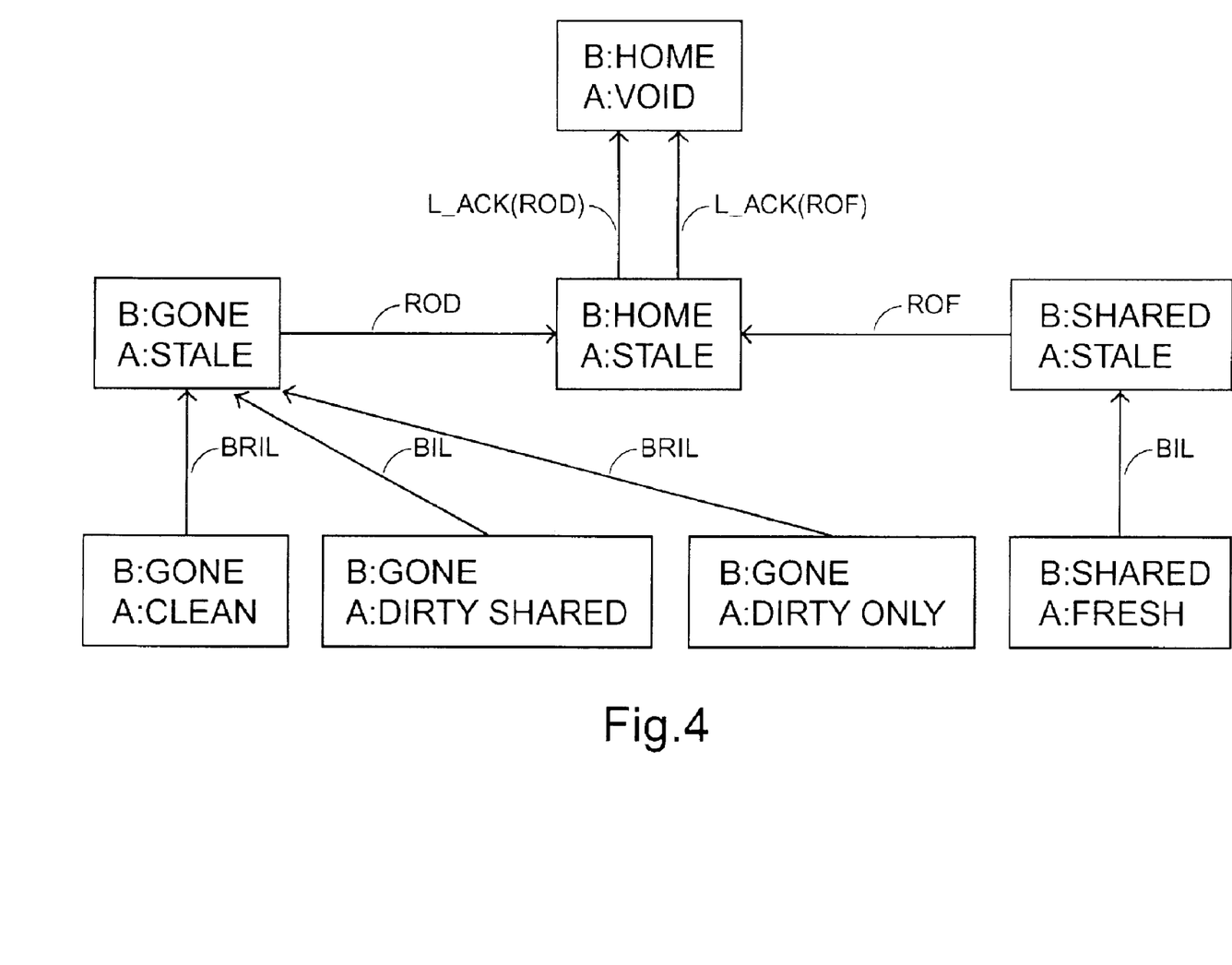
FIG. 4 is a schematic diagram showing various state of a local memory line and a corresponding L3 cache line in response to a local access command, a rollout command and a confirmation signal associated with the rollout command.

In addition, a remote access command asserted by a local processor to a remote node could be involved. The remote access command is:

ROD (Rollout DIRTY): The command is issued to change the state of the local memory line of the remote node, where the specific data is stored, from GONE into HOME, on the condition that the state of the cache line of the local node, where the data is stored, has changed from CLEAN, DIRTY-SHARED or DIRTY-ONLY to STALE; or ROF (Rollout FRESH): The command is issued to change the state of the local memory line of the remote node, where the specific data is stored, from SHARED into HOME, on the condition that the state of the cache line of the local node, where the data is stored, has changed from FRESH to STALE.

The SHARED and HOME as well as GONE and WASH states are states of the local memory line of the remote node recorded in a memory coherency directory. The meanings of these states are described as follows:

HOME: The data from the local memory line is not read by any remote node, and the latest data in the local memory line is stored in the local memory;

SHARED: The local memory was accessed by a remote node and the data in the local memory line is not modified by the remote node;

GONE: The local memory was accessed by a remote node and the data in the local memory line was modified by the remote node; and WASH: The data in the local memory was modified by a remote node and was transmitted to the local node.

Hereinafter, the transition of the states is described by assuming the node 11 is a local node and the node 12 is a remote node. Please refer to FIG. 2 which is a state diagram showing various states of an L3 cache line in response to the above-mentioned local access commands. Assume that a specific data is originally stored in the local memory 1231 of the remote node 12, and the specific data is stored to a cache line of the cache 1141 of the local node 11 via the network 15 in response to the request of a specific processor, e.g. 112, of the local node 11 to access the data. The node 12 is also referred to as a home node of the data.

When the processor 112 asserts a BRL command to request a shared copy of the specific data, the BRL command is a BRL(hit#) command if the specific data has already been stored to the cache 1141. That is, it is in a cache-hit status. Therefore, the data in the cache line can be directly read by the processor 112. If the data is exclusively owned by the processor 112, the state of the cache line would be CLEAN.

In CLEAN state, when the processor 112 is going to read but not to modify the exclusive copy of the data in the cache line, it should assert a BRIL command to the system bus 115. Since the unmodified data is still in the cache 1141, a cache-hit status is still indicated, and the BRIL command is a BRIL(hit#) command. The data in the cache line will be directly read and exclusively owned by the processor 112, and thus the state of the cache line maintains in CLEAN.

In CLEAN state, when the processor 112 is going to read and modify the exclusive copy of the data in the cache line, it should assert a BRIL command to the system bus 115. If the data is in the cache 1141 (cache hit) but has been modified, the BRIL command is a BRIL (hitm#) command. The modified data in the cache line, which becomes different from the data stored in the local memory 1231 of the home node 12, will be directly read off the bus 115 and exclusively owned by the processor 112, and thus the state of the cache line changes from CLEAN to DIRTY-ONLY.

In CLEAN state, when the processor 112 is going to get a shared copy of the data in the cache line, and permits another processor, e.g. 111, to share the data, it should assert a BRL command to the system bus 115. If the data is in the cache 1141 (cache hit) but has been modified, the BRL command is a BRL (hitm#) command. The modified data in the cache line, which becomes different from the data stored in the local memory 1231 of the home node 12, will be directly read off bus 115 by the processor 112 and shared with other processors, and thus the state of the cache line changes from CLEAN to DIRTY-SHARED. In DIRTY-SHARED state, another processor 111 may directly access the data in the cache line from the cache 1141. In other words, in DIRTY-SHARED state, any of the other processors of the local node can directly access the modified data via the system bus without asserting any network transaction request. Therefore, the load of the network can be reduced to a certain extent.

In DIRTY-ONLY state, if the processor 111 would like to share the data in the cache line, it should assert a BRL command to have the state of the cache line change from DIRTY-ONLY to DIRTY-SHARED.

On the contrary, in DIRTY-SHARED state, if any of the processors, e.g. 111 or 112, would like to exclusively own the data in the cache line, it needs to assert a BRIL or BIL command to change the state of the cache line from DIRTY-SHARED to DIRTY-ONLY.

In addition to the above-mentioned local and remote access commands, a confirmation signal B_ACK is also involved in the data transmission of the DSM system according to the present invention. From VOID state, a transition state IDLE of the cache line will be entered in response to a BRL command. Once the BRL command is completed, a confirmation signal B_ACK (BRL) will be asserted to change the state of the cache line into FRESH. Likewise, when the cache line is in FRESH state, a transition state IDLE will then be entered in response to a BRIL or BIL command. Once the BRIL or BIL command is finished, a confirmation signal B_ACK (BRIL, BIL) will be asserted to change the state of the cache line into CLEAN. Further, when the cache line is in CLEAN or DIRTY-ONLY state, a transition state STALE will then be entered in response to a BWL command. Once the BWL command is finished, a confirmation signal B_ACK (BRIL, BIL) will be asserted to change the state of the cache line into VOID.

The other state transitions can be derived from the above description by those skilled in the art, and thus is not to be redundantly described herein.

Please refer to FIG. 3 which is a state diagram showing various states of an L3 cache line in response to the above-mentioned remote access commands. Also, the transition of the states is described by assuming the node 11 is a local node and the node 12 is a remote node. A specific data is originally stored in the local memory 1231 of the remote node or home node 12, and the specific data is stored to a cache line of the cache 1141 of the local node 11 via the network 15 in response to the request of a specific processor, e.g. 112, of the local node 11 to access the data.

In DIRTY-ONLY or DIRTY-SHARED state, the receipt of the LRL command indicates that the data in the cache line is no longer exclusively owned by the local node 11. Instead, all the nodes can share the data. Therefore, the state of the cache line changes from DIRTY-ONLY or DIRTY-SHARED to FRESH.

In DIRTY-ONLY or DIRTY-SHARED state, the receipt of the LRIL or LIL command indicates that the data in the cache line is exclusively owned by the processor 112, and the data in the cache 1141 is to be invalidated. Therefore, the cache line where the specific data was previously stored is not a valid data. The state of the cache line changes from DIRTY-ONLY or DIRTY-SHARED to VOID.

In VOID state, the specific data in the cache line is invalid, and new data is permitted to be written into the cache line. Meanwhile, if any of the processors, e.g. 111 or 112, asserts a BRL or a BRIL command to request a shared or an exclusive copy of the specific data, since there is no that specific data in the cache line, the local node 11 has to request that specific data from the home node 12 again and re-store into the cache line. Therefore, the state of the cache line changes from VOID to IDLE (FIG. 2).

On the other hand, if the specific data in the local memory line of the home node 12 is being accessed by a processor of the node 12, e.g. 121 or 122, the local memory line will be in a transition state, e.g. WASH state. Meanwhile, the node 12 will assert an RTY-BOP (BRL, BRIL) command to the node 11 to refuse the transmission of the specific data to the node 11. In order to improve the efficiency of the system, the node 11 will not wait for the data once it receives the RTY-BOP (BRL, BRIL) command. In stead, the state of the cache line will recover from IDLE to VOID in response to the RTY-BOP (BRL, BRIL) command.

In FRESH state, the specific data in the cache line can be shared by all nodes. Meanwhile, if a processor of the node 11, e.g. 111 or 112, is going to modify a shared copy of the specific data and exclusively own the specific data by asserting a BIL command, the state of the cache line changes from FRESH to IDLE. If the specific data is being accessed by another node, e.g. 12, the local memory line, where the specific data is stored, will be in a transition state, e.g. WASH state. Then, the node 12 will assert an RTY-BOP (BIL) command to the node 11 to refuse to invalidate the specific data in the node 12. In order to improve the efficiency of the system, the node 11 will not wait for the invalidation of the data once it receives the RTY-BOP (BIL) command. Instead, the state of the cache line will recover from IDLE to FRESH in response to the RTY-BOP (BIL) command.

To sum up, in a case that two nodes, e.g. 11 and 12, are requesting the data from each other at the same time, and that requested data is being accessed by the remote node 11 or 12, the remote node 11 or 12 will assert a RTY_BOP command to recover the other to the previous access state so as to prevent from the dead lock problem. Therefore, it is not necessary for the operation system to deal with the dead lock problem in the present method.

The other state transitions can be derived from the above description by those skilled in the art, and thus is not to be redundantly described herein.

Please refer to FIG. 4 which is a state diagram showing various state of a local memory line and a corresponding L3 cache line in response to a local access command, a rollout command and a confirmation signal associated with the rollout command. The local access commands have been discussed above. The rollout command is an ROD or ROF command. The confirmation signal is an L_ACK (ROD) or L_ACK (ROF) signal. The symbol "A" indicates a local node, and the symbol "B" indicates a remote or home node. A specific data has been read from a local memory line of the node "B" and stored in a cache line of the node A.

In a case that the state of the cache line of the node A is CLEAN, DIRTY-SHARED or DIRYT-ONLY, and the state of the local memory line of the node B is GONE, the state of the cache line will be changed into STALE in response to the BIL or BRIL command. That is, the data in the cache line of the node A is waiting for being deleted. Afterwards, the node A asserts a ROD command to the node B to write the data in the cache line back to the node B. Meanwhile, the state of the local memory line of the node B will change from GONE to HOME due to the ROD command. After the data in the cache line of the node A is completely written back to the node B, the node B asserts a confirmation signal L_ACK (ROD) to the node A, and the state of the cache line of the node A changes from STALE to VOID. In other words, the data in the cache line of the node A is invalidated, and new data can be written into the cache line.

In another case that the state of the cache line of the node A is FRESH, and the state of the local memory line of the node B is SHARED, the state of the cache line will be changed into STALE in response to the BIL command. That is, the data in the cache line of the node A is waiting to be deleted. Afterwards, the node A asserts a ROF command to the node B to abandon the data in the cache line thereof. Meanwhile, the state of the local memory line of the node B will change from SHARED to HOME due to the ROF command. After the node B receives the ROF command, the node B asserts a confirmation signal L_ACK (ROF) to the node A, and the state of the cache line of the node A changes from STALE to VOID. In other words, the data in the cache line of the node A is invalidated, and new data can be written into the cache line.

Figure 5:
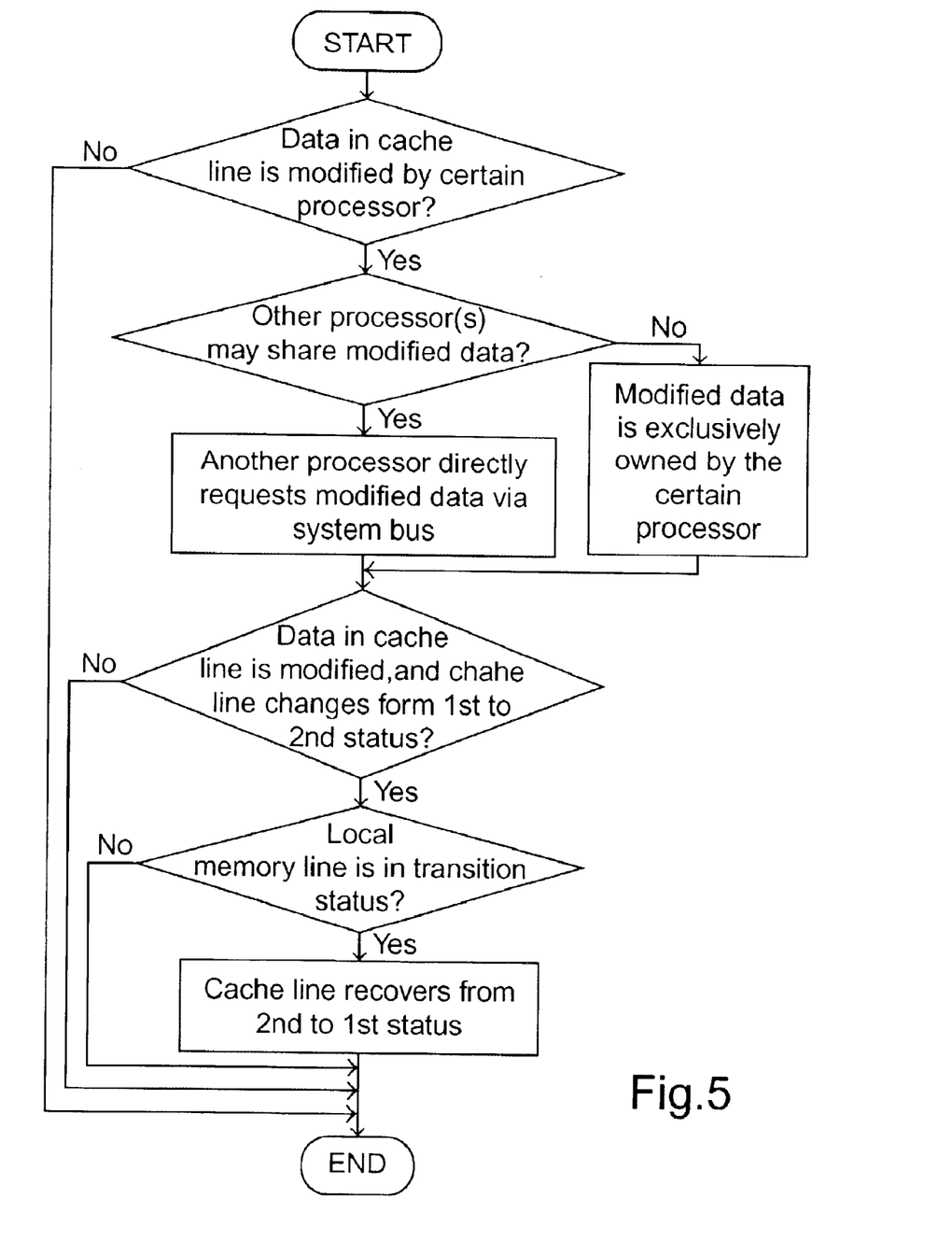
FIG. 5 is a flowchart of an embodiment of a data-maintenance method according to the present invention.

The data maintenance method according to the present invention is summarized by the flow chart of FIG. 5. Whether the data has been modified into a modified data by a processor of a local node is first determined. If positive, whether another processor of the local node is allowed to share the modified data is further determined. If the another processor is allowed to share the modified data, it may directly request the modified data via a bus inside the local node. On the other hand, the modified data will be exclusively accessed by the processor if the other processor(s) is not allowed to share the modified data. Then, when the data is modified or accessed by the processor so as to change the cache line from a first state to a second state, whether a memory line of the local memory of the remote node, where the data is stored, is in a transition state is determined. The state of the cache line will be changed from the second state to the first state if the memory line is in the transition state.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data maintenance method of a distributed shared memory (DSM) system, said DSM system including at least a first and a second nodes, said first node including an external cache for storing a data from a local memory of said second node and at least two processors optionally accessing said data from said external cache, and said data maintenance method comprising steps of:
   discriminating whether said data has been modified into a modified data by a first certain one of said at least two processors;
   discriminating whether a second certain one of said at least two processors is allowed to share said modified data if said data has been modified by said certain processor; and
   directly requesting said modified data by said second certain processor via a bus inside said first node if said second certain processor is allowed to share said modified data.

2. The method according to claim 1 wherein each of said at least two processors is electrically connected to said bus.

3. The method according to claim 1 wherein said bus is a system bus of said first node, and said second certain processor directly request said modified data without asserting any network transaction request.

4. The method according to claim 1 wherein said first and said second nodes are interconnected via a network.

5. The method according to claim 1 wherein said modified data is exclusively accessed by said first certain processor if said second certain processor is not allowed to share said modified data.

6. The method according to claim 1 wherein said discriminating steps are performed according to a cache coherency directory that records the state of a cache line of said external cache where said data is stored.

7. The method according to claim 6 further comprising steps of:
   discriminating whether a memory line of said local memory of said second node, where said data is stored, is in a transition state, when said data is modified or accessed by said first certain processor so as to change said cache line from a first state to a second state; and
   recovering the state of said cache line from said second state to said first state if said memory line is in said transition state.

8. A data maintenance method of a distributed shared memory (DSM) system, said DSM system including at least a first and a second nodes, said first node including an external cache for storing a data from a local memory of said second node and at least two processors optionally accessing said data from said external cache, and said data maintenance method comprising steps of:
   discriminating whether said data has been modified by a first certain one of said at least two processors on the condition that a cache line of said external cache, where said data is stored, is in a CLEAN state;
   changing the state of said cache line from said CLEAN state to either of DIRTY-SHARED and DIRTY-ONLY state if said data has been modified into a modified data; and
   allowing a second certain one of said at least two processors to directly request said modified data via a bus inside said first node when said cache line is in said DIRTY-SHARED state.

9. The method according to claim 8 wherein each of said at least two processors is electrically connected to said bus.

10. The method according to claim 8 wherein said bus is a system bus of said first node.

11. The method according to claim 8 wherein said first and said second nodes are interconnected via a network.

12. The method according to claim 8 wherein said modified data is exclusively accessed by said first certain processor when said cache line is in said DIRTY-ONLY state.

13. The method according to claim 8 wherein said CLEAN, DIRTY-SHARED and DIRTY-ONLY state of said cache line are recorded in a cache coherency directory.

14. The method according to claim 13 further comprising steps of:
   discriminating whether a memory line of said local memory of said second node, where said data is stored, is in a transition state, when said data is modified or accessed by said first certain processor so as to change said cache line from said first state to said second state; and
   recovering the state of said cache line from said second state to said first state if said memory line is in said transition state.

15. The method according to claim 14 wherein said first state is a VOID state, and said second state is an IDLE state.

16. The method according to claim 14 wherein said first state is a FRESH state, and said second state is an IDLE state.

17. The method according to claim 14 wherein said state of said cache line is recovered from said second state to said first state in response to a retry command asserted by said second node.

18. The method according to claim 14 wherein said step of discriminating the state of said memory line is performed according to a local memory coherency directory.

* * * * *